July 31, 1962 M. A. CHESTER 3,047,257
DEVICE FOR CHANGING AIRFOIL PROFILE
Filed April 24, 1958 5 Sheets-Sheet 1
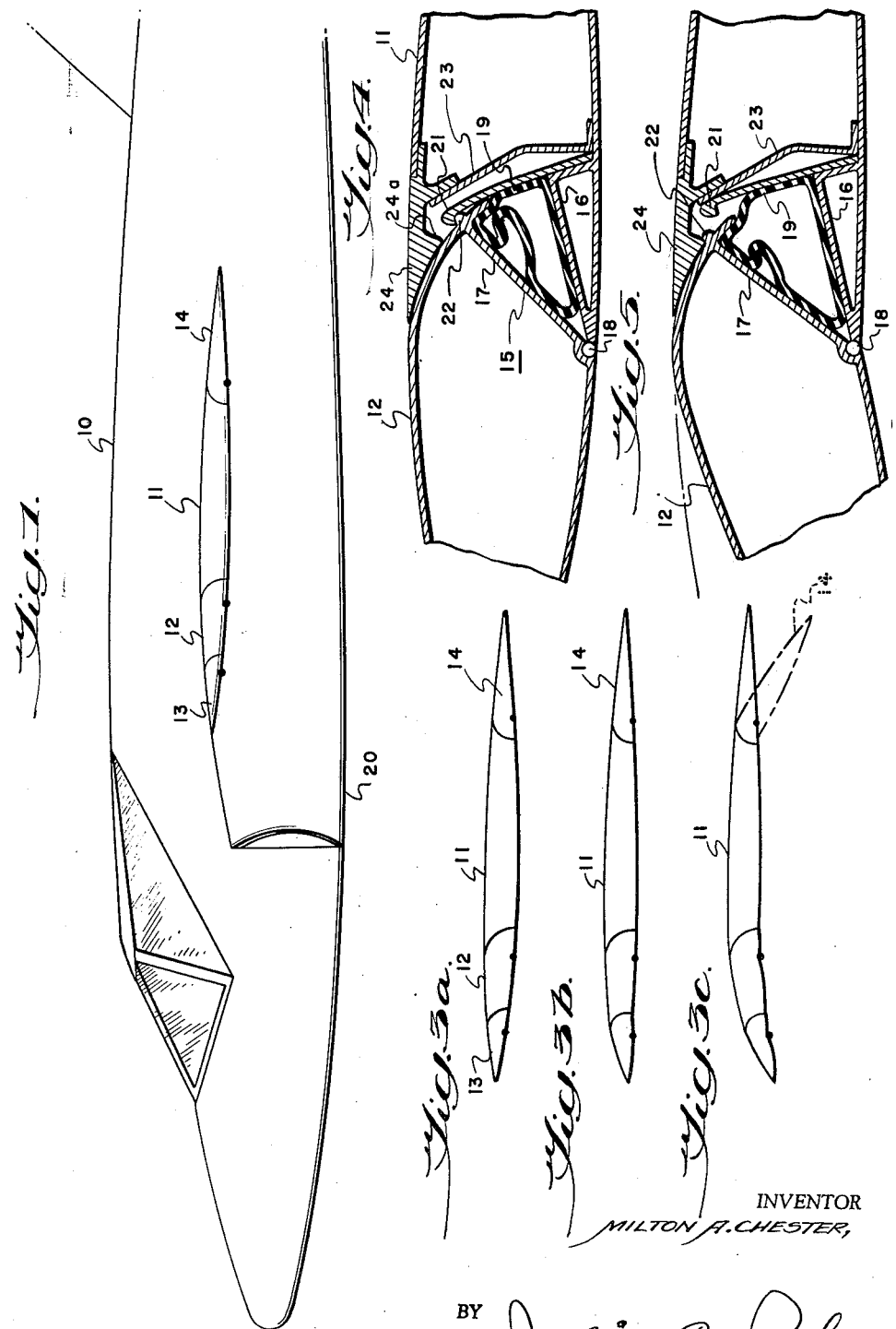
INVENTOR
MILTON A. CHESTER,
BY
ATTORNEY

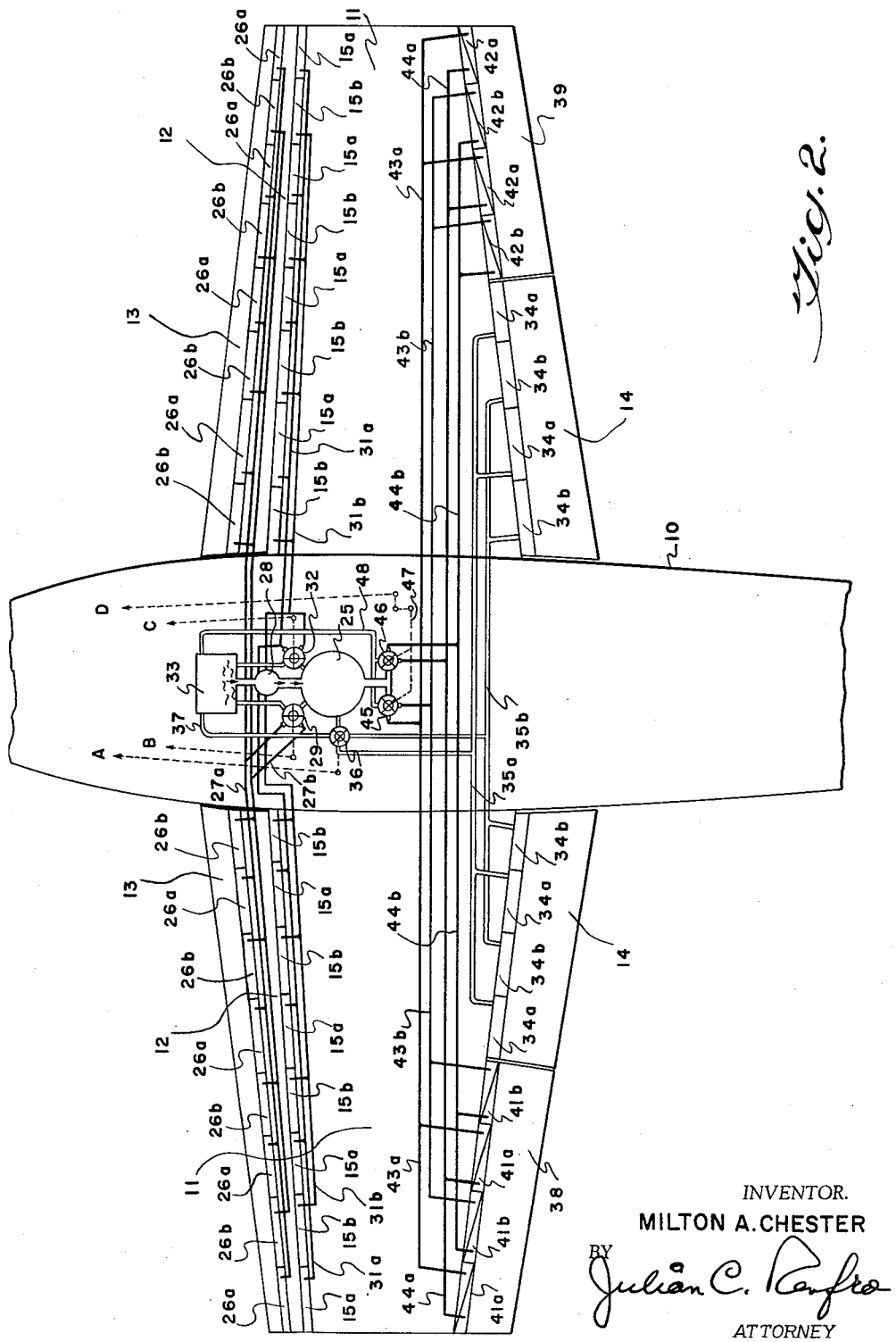

July 31, 1962   M. A. CHESTER   3,047,257
DEVICE FOR CHANGING AIRFOIL PROFILE
Filed April 24, 1958   5 Sheets-Sheet 4
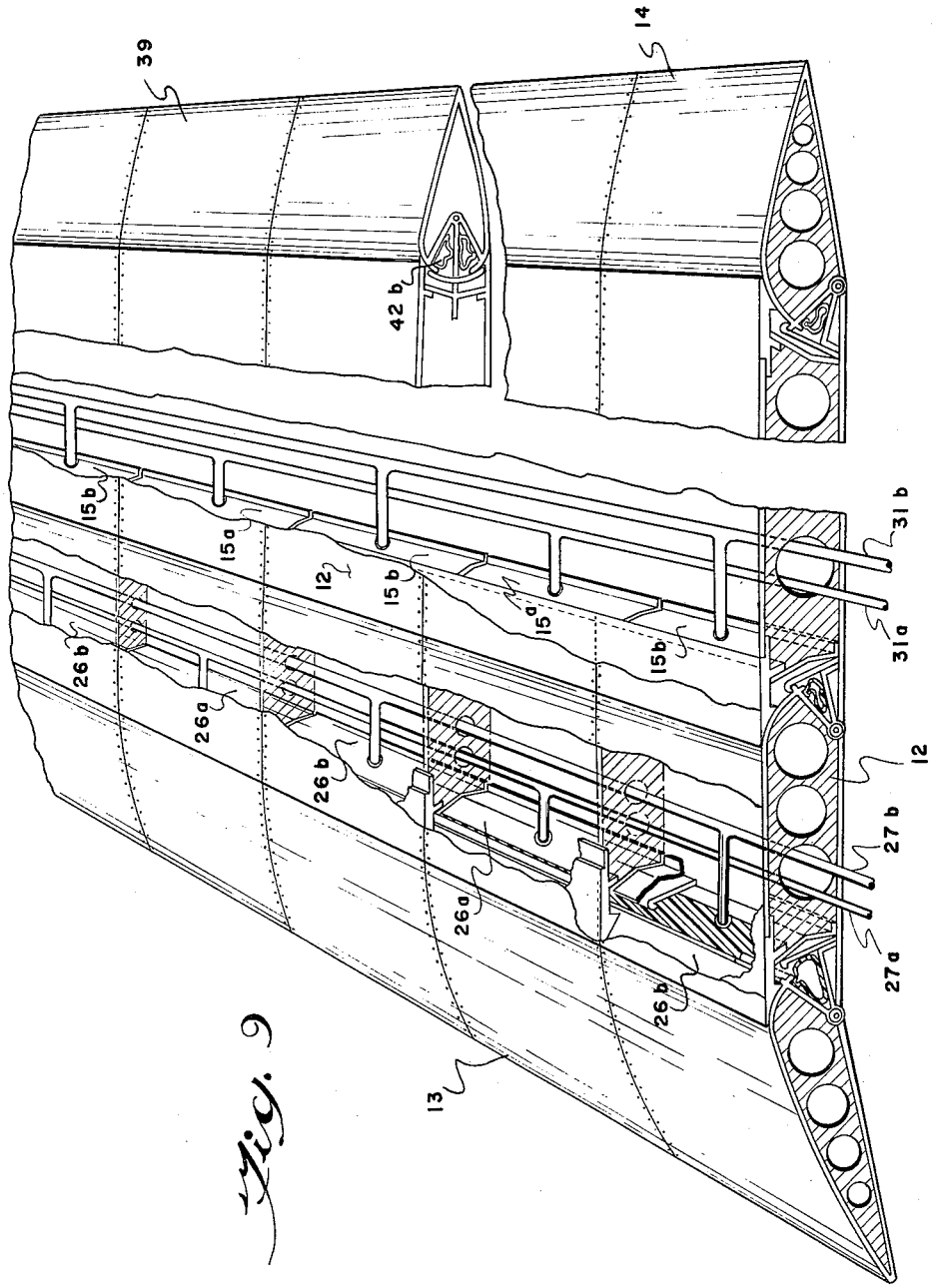
INVENTOR.
MILTON A. CHESTER
BY
ATTORNEY

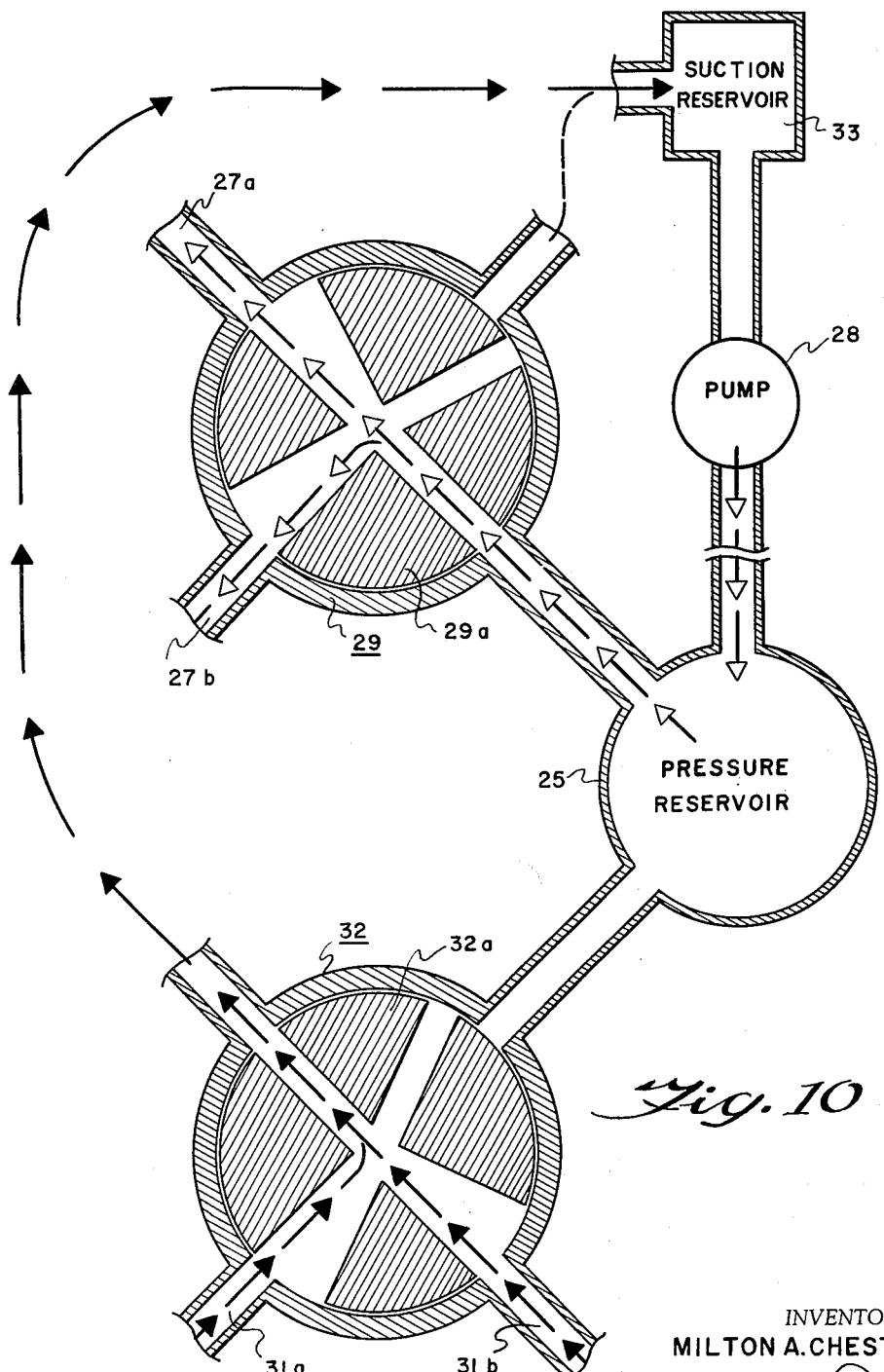

3,047,257
 DEVICE FOR CHANGING AIRFOIL PROFILE
Milton A. Chester, Sedalia, Colo., assignor to Martin-
  Marietta Corporation, a corporation of Maryland
       Filed Apr. 24, 1958, Ser. No. 730,650
              6 Claims.  (Cl. 244—85)

This invention relates to a device for changing the profile of the wing or tail surface of an aircraft, and more particularly to a fluid operated control system employing at least one expansible fluid motor located adjacent the hinge line of a flight-controlling surface of the wing or tail, so that the surface may be operated by fluid pressure.

In the past, the movement of certain elements of the wing or tail surfaces of the aircraft have been accomplished in a relatively simple manner such as by the use of cables, pulleys and actuating linkages. However, as the operating speeds for aircraft increase, progressively thinner wings are required for the minimization of drag, and existing means for moving flaps or for accomplishing other changes in camber, or for movement of control surfaces have proven to be unsatisfactory and inadequate.

Thin wings designed for supersonic flight suffer the disadvantage of having a comparatively small amount of lift at lower speeds, such as during landing and taking off. It is known that by the use of leading edge flaps, the lift of thin wings can be increased at lower speeds by preventing the separation of flow at the leading edge of the wing. Also, at high speeds, leading edge flaps often can be used to obtain lower induced drag, with a consequent increase in speed. Because of the thinness of wings used on supersonic aircraft, it has been difficult to provide devices for deflecting the flaps of the wing, for most devices powerful enough to deflect the wing surface at high speeds have physically been too large to be accommodated within available spaces in the wing.

According to the present invention, a fluid operated control system is provided wherein at least one expansible fluid motor is positioned in each wing of an aircraft so that by the application of fluid pressure, a desired change in airfoil profile can be accomplished. The motor, which preferably is located at the hinge line of the surface to be deflected, may be defined by a fixed bulkhead supported in a fixed portion of the wing, and a movable bulkhead attached to the movable surface of the wing in hinged relation to the fixed bulkhead. An expansible tube may be employed between the bulkheads to receive the fluid pressure, so that by the application of pressure to the expansible tube, the movable bulkhead is caused to move with respect to the fixed bulkhead, thereby to bring about deflection of the movable surface of the wing in the desired manner.

In many instances in which this invention is utilized for the operation of wing flaps, it is desired to employ a latching arrangement on the interior of the wing adjacent the movable bulkhead to positively hold the flap in the non-deflected position except when pressure is being applied to the fluid motor. A latching shoulder may be provided on the movable bulkhead, with a spring loaded latch being located on the fixed bulkhead and biased into a position so that it will automatically engage the latching shoulder when the motor is in the nonexpanded condition. A portion of this latch forms one of the contours or surfaces of the fluid motor, and the arrangement is such that when the expansible tube of the motor is caused to expand, it acts against the latch, causing it to be moved out of engagement with the latching shoulder, thereby permitting the movable bulkhead to move the flap into the deflected position.

A series of separate fluid motors are preferably employed for the operation of each movable surface of each wing, and the fluid operated control system is so arranged that alternate motors of each movable wing surface are supplied with fluid from alternate lines or pipes carrying fluid from the fluid reservoir. This makes possible the continued operation of a movable surface despite damage to one line or pipe carrying fluid pressure from the source, or to one motor. The valve controlling the application of fluid to the fluid motors of each movable wing element is under the control of the pilot so that he may selectively operate each movable surface of the wing. If desired, double leading edge wing flaps may be utilized, with the motors of each flap likewise under separate control of the pilot, so that he may move the leading edge flaps separately or concomitantly as may be necessary.

So that certain control surfaces of the aircraft such as ailerons or tail surfaces can be positively operated in both directions away from the nondeflected position, according to a modification of this invention, a double-acting fluid motor is provided comprising a longitudinal bulkhead, and a pair of relatedly movable bulkheads positioned on each side of the longitudinal bulkhead and hingedly attached along one edge of the longitudinal bulkhead. An expansible tube is located on each side of the longitudinal bulkhead between it and each of the movable bulkheads so as to create a double-acting expansible fluid motor. The relatedly movable bulkheads are integral with or attached to the control surface to be deflected, and appropriate control means are employed so that the respective expansion and contraction of the expansible tubes constituting a double-acting motor can be brought about so as to selectively control the position of the surface.

A fluid operated control system for an aircraft according to this invention can comprise a fluid pressure reservoir and pump means adapted to maintain a positive pressure in the pressure reservoir. A plurality of fluid pressure operated control surfaces are disposed on the aircraft, with each of the fluid pressure operated control surfaces being actuated by at least one expansible fluid pressure motor located adjacent the hinge line of the surface. In the event some of the control surfaces of the aircraft have single-acting motors, not power operated in both directions, a suction reservoir may be provided in the aircraft so that by the application of suction to such motors, movement from the deflected position to the non-deflected position will be brought about. Fluid lines interconnect the fluid pressure motors and the reservoir or reservoirs, and control means are provided for controlling the flow of fluid through the lines so that by the operation of said control means, the control surfaces of the aircraft may be deflected in a desired manner.

Other features in advantage of this invention will become apparent from a study of the drawings in which:

FIGURE 1 is a side elevational view of an aircraft equipped with movable wing surfaces according to this invention;

FIGURE 2 is a partial plan view of an aircraft with portions of the fuselage and wings cut away to reveal the fluid control system utilized for operating various movable surfaces of the wings;

FIGURES 3a, 3b and 3c illustrate a wing profile which the various stages of deflection of the wing flaps are indicated;

FIGURE 4 is an enlarged cross-sectional view of a wing revealing one fluid motor arrangement employed to deflect a wing flap;

FIGURE 5 is a cross-sectional view similar to FIGURE 4 but revealing the manner in which the motor expands to bring about the deflection of the surface;

Figure 6:
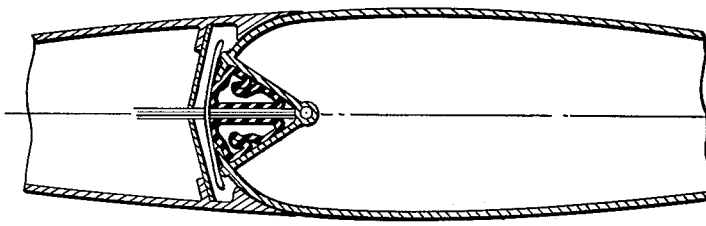
Figure 7:
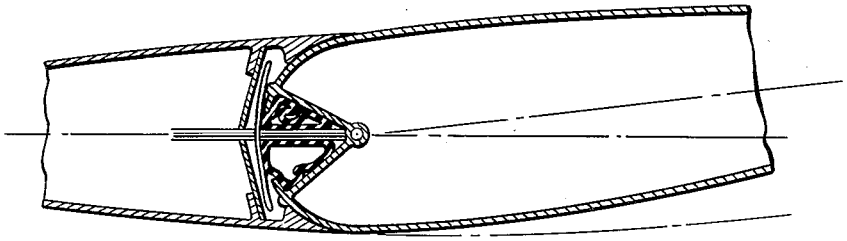
Figure 8:
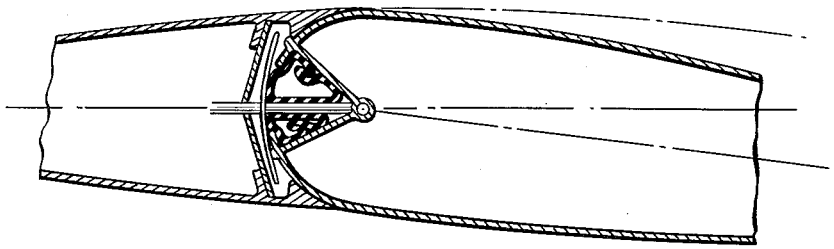

FIGURES 6, 7 and 8 reveal a double-acting type of fluid motor, and illustrate the manner in which a control surface such as an aileron or tail surface may be deflected away from the nondeflected position in either of two directions;

FIGURE 9 is a perspective view of a wing with portions broken away to reveal internal construction, and details associated with the fluid pressure operated flaps and ailerons; and FIGURE 10 is an enlarged cross-sectional view illustrating the construction of the valves employed for controlling the flow of the fluid to the movable wing surfaces.

Turning now to FIGURE 1, an airplane is illustrated having a wing 10 that comprises a fixed wing portion 11, double leading edge flaps 12 and 13, and a trailing edge flap 14. The airplane may be powered by appropriate jet engines 20 located substantially below the wing, but it is to be understood that this invention is usable in conjunction with propeller-driven or rocket-driven aircraft, or jet engine aircraft with the engines located in a different manner.

As is illustrated in FIGURES 3a, 3b and 3c, the movable nose elements or leading edge flaps 12 and 13 may be selectively moved to deflected positions wherein the airplane will have lift characteristics commensurate with the speed of the aircraft and with the manner in which the aircraft is being operated. Similarly, flap 14 may be moved to a partially deflected or a fully deflected position as may be desired.

FIGURES 4 and 5 reveal an embodiment of this invention wherein a single-acting fluid motor 15 is used to deflect a movable portion of the wing in a given direction. This fluid motor comprises a fixed bulkhead 16, and a movable bulkhead 17 connected to the fixed bulkhead by suitable hinge 18 in such a manner as to define therebetween a chamber to receive fluid pressure. According to this embodiment, an expansible tube 19 is confined between the bulkheads in such a manner that by the expansion of tube 19 as shown in FIGURE 5, movement of the bulkhead 17 and the movable wing portion associated therewith is brought about. The bulkhead 16 in this instance may be a part of fixed wing portion 11, and movable bulkhead 17 part of leading edge flap 12. Hinge 18 may form the principal support on fixed wing portion 11 for leading edge flap 12.

As may be seen in FIGURE 2, a plurality of fluid motors are preferably employed for the deflection of each movable surface of the wing. So that certain movable surfaces may be positively locked against undesired deflection, a mechanical latch may be provided to secure the movable bulkhead against movement except when a suitable amount of fluid pressure has been applied to the expansible tube 19. As shown in FIGURES 4 and 5, a latch 21 may be provided on the fixed portion 11 of the wing in such a manner that it extends coterminously with the bulkheads 16 and 17 so as to form a portion of the fluid motor that is contacted by tube 19. A latching shoulder 22 is provided adjacent the end of movable bulkhead 17 remote from hinge 18 so that it will be engaged by latch 21 when the fluid motor is in the nonexpanded position. Latch 21 may be a spring-like member constructed to be biased in a counterclockwise direction as viewed in FIGURES 4 and 5 so that it will automatically move in the direction to engage latching shoulder 22 when the motor is in the non-expanded condition. When the motor 15 is caused to expand, it acts against the latch, causing the latch to be moved out of engagement with the latching shoulder. A stationary wing member 23 may be provided to define the forward extent of the fixed portion 11 of the wing, and a tapered wing portion 24 may be employed on wing member 11 to extend above the upper surface member 12 to provide a desirable contour for this portion of the wing. Also, the interior of portion 24a acts as a stop for shoulder 22, to prevent the flap 12 from moving beyond a desired deflected position. As will be observed from FIGURE 5, the stationary member 23 serves the additional function of preventing the latch 21 from being deflected by tube 19 beyond a desirable extent.

It is, therefore, to be seen that bulkheads 16 and 17 define an expansible fluid motor which will cause the deflection of movable surface 12 upon the application of fluid pressure to the interior of the chamber defined between these bulkheads. The expansible tube 19 disposed between bulkhead 16 and 17 to receive the fluid pressure is in contact with the latch member 19 which extends longitudinally of the wing, so that as the fluid pressure within tube 19 increases, the latch 21 is moved outwardly away from the latching position, thereby permitting the flap to be deflected. The tube 19 can be secured at several locations to the bulkheads constituting the motor, so that upon being subjected to a decreased internal pressure, the tube walls tend to come together and thereby cause the movable element associated with the motor return to the nondeflected position. This arrangement is not necessary in all instances, for often the typical air pressures to which the movable surfaces are subjected are sufficient to move the surface back to the nondeflected position upon the fluid pressure in the motor being decreased.

Referring now to FIGURE 2, the preferred form of fluid control system for operating the various movable portions of the wings is shown. Leading edge flaps 13 may extend for a substantial portion of the length of each wing, and a plurality of motors 26a and 26b are provided in an alternate arrangement along the hinge line of each flap 13 so that the pilot may deflect these flaps to the extent desired. Similarly, a plurality of fluid motors 15a and 15b are provided in an alternate arrangement for the operation of flaps 12.

Lines or tubes 27a and 27b extend into the wings as illustrated in FIGURE 2, and are preferably connected in an alternate arrangement to the fluid motors associated with flap 13, to supply them with pressure fluid from a source hereinafter described. As shown, line 27a is connected to motors 26a, and line 27b connected to motors 26b. Similarly, lines or tubes 31a and 31b are connected in an alternate arrangement to supply pressure fluid motors 15a and 15b, respectively.

As shown in FIGURE 9, tubes 27a and 27b may be disposed in flap 12, and tubes 31a and 31b disposed in wing portion 11. This arrangement of motors connected by alternate lines is preferred, for if only some of the expansible motors are damaged, or if only one of the fluid lines supplying fluid for the operation of the motors of a wing surface is damaged, the wing surface may, nevertheless, be operable. In the event the fluid employed in fluid lines 27a and 27b or 31a and 31b is hydraulic fluid, a so-called hydraulic fuse may be employed in each line to prevent loss of a considerable portion of the fluid of the system in the event of a leak. The Waterman Patent No. 2,821,209 is illustrative of this type of device, and functions to shut off fluid flow in excess of normal through a line, but which permits normal flow to take place through the line into which it is connected. If the fluid employed in the system is a gas, another type of fluid fuse may be employed if desired.

A fluid pressure reservoir 25 in the nature of an accumulator may be provided for supplying fluid pressure for operation of the movable elements of the aircraft, and it may be located in a central portion of the fuselage, as shown in FIGURE 2. A suction reservoir 33 may also be provided so that the return of certain single-acting motors to the nondeflected position can be facilitated. Pressure creating means such as pump 28 may function to maintain the pressure reservoir and the suction reservoir at the desired position and negative pressures, respectively.

So that the pilot (or the automatic pilot or other control arrangement) can selectively bring about deflection of leading edge flap 13 to the extent desired, a multiway valve 29 of the type shown in FIGURE 10 may be provided for controlling the flow through tubes 27a and 27b, and a similar valve 32 employed for positioning flaps 12 by controlling the flow through tubes 31a and 31b. According to the preferred arrangement, the deflection of both sets of flaps 12 and 13 is preferably individually controlled, so that the pilot can deflect the flaps as may be desired.

According to the illustrated arrangement, multiway valves 29 and 32 are each connected to pressure reservoir 25 as well as to suction reservoir 33, the latter being effective to bring about the restoration on occasion of the flaps 12 and 13 to the neutral position, although the dynamic force of the air flowing over the wing surfaces usually tends to move the control surfaces to the nondeflected position as soon as positive pressure is relieved. As seen in FIGURE 10, rotary valving members 29a and 32a in valves 29 and 32 are movable to bring about desired connection of the respective fluid motors to the reservoirs 25 and 33. For example, rotary member 29a is shown in the position connecting tubes 27a and 27b to the pressure outlet of pressure reservoir 25 so as to bring about deflection of flap 13. In contrast, in valve 32, the member 32a has been rotated a few degrees counterclockwise from the position corresponding to the position of the valve member 29a of valve 29. This places member 32a in the position so that the pipes 31a and 31b are connected to the suction reservoir 33 which functions to restore the movable nose elements 12 to the normal or undeflected position. As indicated in FIGURE 2, appropriate control mechanisms attached to valves 29 and 32 are provided for the control by the pilot so that the movable inner portions of these valves may be operated in the manner desired.

The trailing edge flaps 14 are operable by means of a plurality of fluid motors 34a and 34b placed in an alternate arrangement, these motors being responsible for moving the flaps downwardly into the deflected position when subjected to the pressure from pressure reservoir 25. Pipes or tubes 35a and 35b extend to the motors 34a and 34b, respectively, with these pipes being connected to multiway valve 36 in the same general manner illustrated in FIGURE 10 with respect to valves 31 and 32. Valve 36 is under the control of the pilot so that by manipulating it to a first position, pressure from reservoir 25 is asserted against the motors 34a and 34b to deflect flaps 13, and when in a second position, these motors are connected to the suction reservoir 33 via pipe 37 so that the vacuum thereof can be utilized to draw flaps 14 back to the normal or undeflected position.

Turn-controlling surfaces such as ailerons 38 and 39 are located in the left and right wings, respectively, and are operated by double-acting hydraulic motors 41a and 41b placed in an alternate arrangement similar to that of flap motors 26a and 26b. Motors 41a and 41b each have an upper and a lower section, as indicated in FIGURE 2, and illustrated in FIGURES 6 through 9, and by the proper admission of pressure to one section of a motor and simultaneous relief of pressure from the other section of that motor, the effect will be to cause the aileron to tend to move up or down as the case may be. As illustrated in FIGURE 2, the upper motor sections of motors 41a are connected by conduit 43a to the multiway valve 45, whereas the upper motor sections of motors 41b are connected by conduit 43b to this valve. Multiway valve 45, much like valves 29 and 32, is connected both to the pressure reservoir and suction reservoir, and controls the flow of fluid to these upper motor sections. Therefore, by the admission of pressure to the upper motor sections, this aileron is moved downwardly, and by moving the valve into the opposite position, the fluid in these motor sections can flow through pipe 48 to the suction reservoir, to permit movement of the aileron in the upward or return direction.

The conduits 43a and 43b extend into the right wing, and since the ailerons of an airplane are to be moved in opposite relation, these conduits are connected to the lower section of motors 42a and 42b, respectively. Therefore, for example, as valve 45 is moved so as to connect conduits 43a and 43b to the pressure reservoir, the left aileron 38 is moved downwardly and right aileron is moved upwardly.

Conduits 44a and 44b likewise extend between the motors of ailerons 38 and 39, for conduit 44a is connected to the lower section of motors 41a of the left aileron, and to the upper section of the motors 42a of the right aileron, and conduit 44b is connected to the lower section of motors 41b and the upper section of motors 42b. Conduits 44a and 44b are each connected to multiway valve 46 which is connected to the reservoirs in the same manner as valve 45, so that one section of each motor to which the conduits are connected may be selectively subjected to the pressure of reservoir 25, and the other section of each motor connected to the suction of reservoir 33, through pipe 48.

Multiway valves 45 and 46 are connected together by means of linkages 47, so that for example if the pilot desires to bank the airplane to the right he can move these valves relatedly to bring about the admission of pressure to the lower sections of motors 42a and 42b of the right aileron and the upper sections of motors 41a and 41b of the left aileron. More particularly, this valve motion causes pressure to be established in conduits 43a and 43b, and a relief of pressure from conduits 44a and 44b in order that the desired aileron motion will be brought about. Similarly, motion of linkage 47 in the opposite sense by the pilot causes pressure to be applied to conduits 44a and 44b, and a relief of pressure from conduits 43a and 43b, thereby to bring about banking of the aircraft to the left.

Valve 36 may be operated by suitable electrical or electromechanical means, shown for convenience in FIGURE 2 by dashed line A, whereas operation of valve 29 to control the droop of forward flap 13 is achieved by actuation of means B, either by the pilot or by automatic control means. Similarly, valve 32 is actuated by control means C to control the droop of flap 12, and valves 45 and 46 are actuated by the proper movement of linkage 47 by control means D.

It is to be understood that this invention possesses considerable breadth, and should not be limited to the particular embodiment shown. For example, the pressure fluid can be of a gaseous nature, such as compressed air, or of a liquid nature, such as of hydraulic fluid. Pressures in the order of magnitude of several hundred pounds per square inch are typically utilized in the system so that even if hydraulic fluid be used, comparatively small volumes will be sufficient due to the high pressures used. In any event, the control system weight is less than the weight of prior art mechanical and electro-mechanical arrangements, particularly when it is realized that considerable structure in the wing and tail members is then necessary to react the force being utilized to deflect the control surfaces. In contrast, very little wing or tail structure is required for reacting the forces associated with control member movement according to this invention.

Although a comparatively conventional aircraft was illustrated in the drawings, it is to be understood that this invention can be utilized in various types of vehicles, such as in aircraft not using ailerons or conventional control surfaces, but composite control surfaces as elevons or the like.

I claim:

1. A fluid operated control system for an aircraft having thin airfoils comprising a fluid pressure reservoir, a suction reservoir, pump means adapted to maintain a positive pressure in said pressure reservoir and a negative pressure in said suction reservoir, a plurality of fluid pressure operated control surfaces on said thin airfoils of said aircraft, each of said fluid pressure operated control surfaces being actuated by at least one expansible fluid pressure motor located adjacent the hinge line of said surface, fluid lines interconnecting said fluid pressure motors and said reservoirs, control means for controlling the flow of fluid in said lines, so that by the operation of said control means, said control surfaces of said aircraft may be deflected in a desired manner and automatic locking means to prevent undesired deflection of said control surfaces.

2. An aircraft having fluid actuated control surfaces comprising a pressure reservoir carried in said aircraft, pump means for maintaining said reservoir in the desired pressure condition, a plurality of expansible fluid pressure motors disposed adjacent the hinge line of each of said fluid actuated control surfaces for deflecting said surface so as to control the flight path of said aircraft, fluid carrying lines interconnecting said motors with said reservoir, the motors associated with the control surfaces of the aircraft being connected in an alternate arrangement, with one set of fluid lines connected to supply pressure fluid to a first set of motors, and another set of fluid lines connected to supply pressure fluid to a second set of fluid motors, control means for controlling the flow of fluid in said lines, whereby a control surface can be deflected despite damage to a motor of one or the other of said sets of motors, or despite damage to one set of fluid lines, and locking means adapted to hold said control surfaces in the nondeflected position when said motors are not being acted upon by fluid pressure.

3. A fluid operated control system for actuating a control surface of an aircraft, comprising a fixed airfoil surface, and a movable airfoil surface hinged to said fixed airfoil surface, an interior portion of said movable airfoil surface forming a fluid motor, said motor comprising a fixed bulkhead forming an integral part of said fixed airfoil surface and being directly connected to the hinge between said surfaces, a second bulkhead on said movable airfoil surface disposed closely adjacent said fixed bulkhead, said second bulkhead being directly connected to said hinge and being capable of movement about said hinge away from said fixed bulkhead, said bulkheads together with said hinge forming an expansible chamber motor capable of actuating said movable airfoil surface, means for applying fluid pressure to said motor to bring about movement of said second bulkhead away from said fixed bulkhead when it is desired to deflect said movable airfoil surface, and automatic locking means to prevent undesired deflection of said movable airfoil surface.

4. A fluid operated control system for actuating a control surface of an aircraft, comprising a fixed airfoil surface, and a movable airfoil surface hinged to said fixed airfoil surface, an interior portion of said movable airfoil surface forming a fluid motor, said motor comprising a fixed bulkhead forming an integral part of said fixed airfoil surface and being directly connected to the hinge between said surfaces, a second bulkhead on said movable airfoil surface disposed closely adjacent said fixed bulkhead, said second bulkhead being directly connected to said hinge and being capable of movement about said hinge away from said fixed bulkhead, said bulkheads together with said hinge forming an expansible chamber motor capable of actuating said movable airfoil surface, an expansible tube capable of carrying substantial fluid pressure disposed between said bulkheads, means to apply fluid pressure to said tube to bring about movement of said second bulkhead away from said fixed bulkhead when it is desired to deflect said movable airfoil surface, and automatic locking means to prevent undesired deflection of said movable airfoil surface.

5. The control system as defined in claim 4 in which said automatic locking means includes a latch provided adjacent one of said bulkheads, and a latching shoulder provided on the other bulkhead, said latch being spring loaded in the direction to hold it in engagement with said latching shoulder, and presenting a surface in contact with a portion of said expansible tube, said latch, when in contact with said latching shoulder being arranged to hold said movable airfoil surface in its non-deflected position with respect to said fixed flight surface, and being arranged to release its connection with said latching shoulder upon said tube expanding against said surface of said latch.

6. An aircraft having fluid actuated wing control surfaces comprising a pressure reservoir carried in said aircraft, pump means for maintaining said reservoir in the desired positive pressure condition, at least one expansible fluid pressure motor disposed adjacent the hinge line of each of said fluid actuated control surfaces for deflecting said surfaces so as to control the flight path of said aircraft, fluid carrying tubes interconnecting said motors with said reservoir, control means for controlling the flow of fluid in said tubes, said control surfaces being equipped with single-acting motors, with automatic locking means to prevent undesired deflection of the surfaces.

References Cited in the file of this patent

UNITED STATES PATENTS

| | | |
|---|---|---|
| 2,405,208 | Harris | Aug. 6, 1946 |
| 2,597,769 | Ashkenas | May 20, 1952 |
| 2,643,833 | Ambroise | June 30, 1953 |
| 2,660,663 | Horkey | Jan. 19, 1954 |
| 2,753,134 | Gordon | July 3, 1956 |
| 2,753,835 | Gehrig | July 10, 1956 |